United States Patent Office 3,088,591
Patented May 7, 1963

3,088,591
LINEAR DIMENSION GAUGE
Johannes Franz Perthen and Hans Karl Steudel, Hannover, Germany; said Steudel assignor to said Perthen
Filed Aug. 29, 1958, Ser. No. 758,158
4 Claims. (Cl. 209—88)

This invention relates to linear dimension gauges with a movable feeler and a dial pointer controlled by the feeler, in which the feeler serves for exploring the length or thickness of an article or object to be measured, and the pointer indicates the result of the measurement on a scale of the dial. In the known gauges of this kind, when the measurements follow rapidly upon one another, as occurs in the case of measurements of articles of manufacture measured serially, the operator's eye soon tires in reading the scale and errors may easily occur.

This invention has for its main object to improve or facilitate the reading of the measured values, by arranging for the pointer not to swing back to the zero position or end of the scale between readings, as in the known gauges, when removed from one article and before indicating a new measured value.

The improved linear-dimension gauge is provided with an electrical gauge head having a reciprocable feeler for sensing individual articles of subject matter to be gauged and means for converting the feeler movements into electrical output signals representative of the value of the measured dimension. An electrical measuring mechanism is connected to the head and has a pointer for indicating the measured values. Automatic coupling means operably couple the measuring mechanism and the gauge head feeler. A locking device is provided for releasably holding the pointer at indicating positions corresponding to the last successive indication representative of a gauge dimension reading taken on the subject matter comprising an electronic circuit having capacitors chargeable to a capacitance value representative of the measured value between successive gauge readings. Means are connected to respond to the capacitance value to maintain the pointer at indicating position as long as the capacitors are in a charged condition, and means are provided to discharge at least some of the capacitors between successive gauge readings.

The automatic coupling means comprises an electrical circuit having circuit switches responsive to the gauge head output signals for connecting the measuring device with the gauge head.

The improved gauge apparatus includes sorting means responsive to the capacitors for distributing the articles to separate positions representative of the measured value stored in said capacitors. The sorting means are already known and can be of the type described, for example, in United States patent, No. 2,592,157.

The electrical measuring mechanism comprises an electronic circuit having a memory comprising storage means chargeable to capacitance values representative of the measured values between successive gauge readings, means connected to respond to the capacitance value stored to maintain the pointer at indicating position as long as the storage means are in a charged condition and means to discharge at least some of the storage means between successive gauge readings.

The objects and advantages of the invention will hereinafter appear from the following description, given with reference to the accompanying drawings, in which:

FIG. 1 is a schematic diagram illustrating an electrical linear-dimension gauge with an electrical feeler having a measurement-value circuit to which there is connected an electronic tube circuit with controlled electric coupling between the feeler and the indicating dial. The pointer in this case is locked or held fast by electrical storage of the measured value, after the switching off of the measuring instrument; this figure shows the initial position of the parts;

Figure 1:
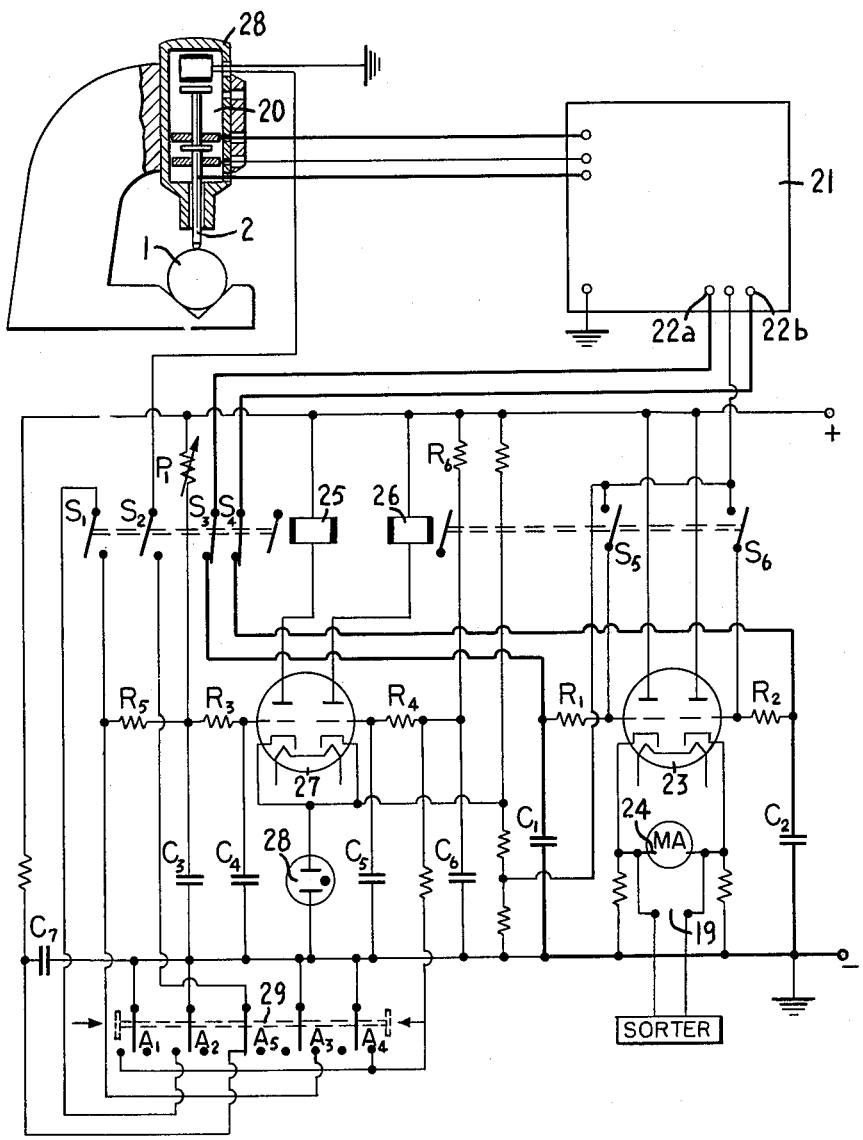
Figure 2:
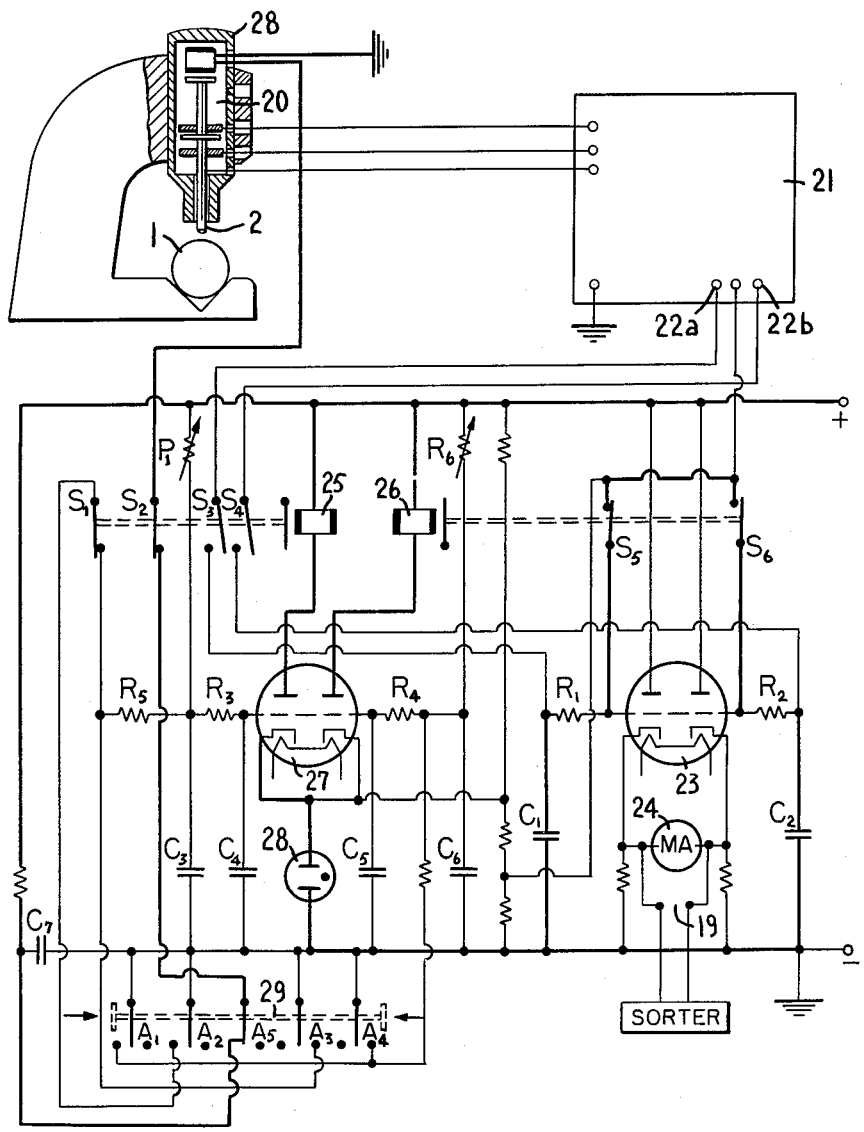
FIG. 2 is a schematic of the same apparatus as FIG. 1, but with the feeler disconnected from the indicating instrument and the pointer of the dial held fast.
Figure 3:
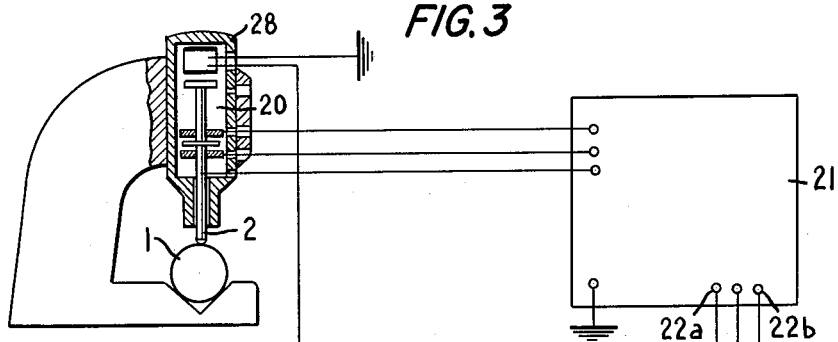
FIG. 3 is a schematic of the same apparatus as FIG. 1, but with the control switch tipped to the right in the measuring position.
Figure 3:
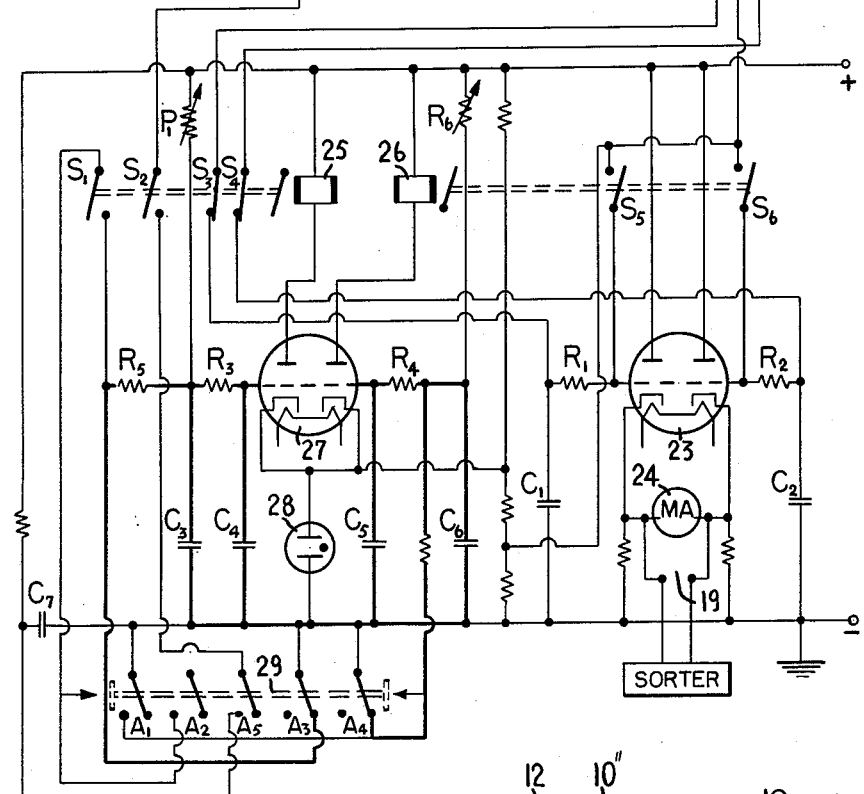
Figure 4:
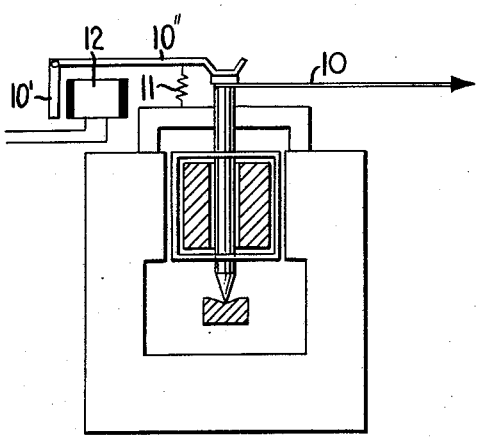
FIG. 4 is a sectional view of a gauge with a mechanical pointer lock, which is releasable by electrical control, and is illustrative of a gauge wherein the feeler controls the pointer of the measuring mechanism in known manner.

According to FIGS. 1 to 3 a linear dimension gauge apparatus comprises an electrical gauge head 20 having a reciprocable feeler 2 for sensing individual articles 1 of subject matter to be gauged and means for converting the feeler movements into electrical output signals representative of the value of the measured dimension. The signals are produced on the output terminals 22a and 22b of the amplifier 21 by a capacitance effect. The signals control a relay, which actuates two switch sets operating in opposite directions, one set being closed when the other is opened. The one switch set is connected in the control lead to the feeler, and the other switch set in the measurement value lead to the indicator. This lead contains, between the switch set and the indicator, suitable condensers as storage arrangement for the measured value, to hold the pointer deflected after the respective switch has been opened.

The tube circuit preferably utilises a twin triode, one of the anode circuits of which includes the relay already mentioned, which controls the switch sets connected respectively in the control lead and in the measured value lead. The other anode circuit of the twin triode controls another relay, which actuates those switches which serve for the discharge of the condensers serving as storage arrangement, that is to say for zeroizing the pointer.

In FIGS. 1 to 3, the feeler 2 is represented as a component of an electric length-measuring feeler or senser of known type, which controls the measurement value circuit or the amplifier 21 by a capacitance effect, and produces on the output terminals 22a and 22b of this circuit the appropriate voltage proportional to the length, thickness or other dimension of the article to be measured. The output terminals 22a and 22b are connected to the measured value condensers $C_1$ and $C_2$ through the measured value lead, in which the switch set $S_3$, $S_4$ is arranged, in the grid circuits of the twin triode of the tube voltmeter circuit 23/24. Consequently the measured value voltage formed at the terminals 22a and 22b of the measured value circuit charges up the two measured value condensers $C_1$ and $C_2$ when the switches $S_3$ and $S_4$ are closed, the level of charge of the condensers is indicated through the grid resistances $R_1$ and $R_2$ and the tube voltmeter formed of the tube 23 and the instrument 24, as shown diagrammatically, with thick solid lines, in FIG. 1.

When the switches $S_3$ and $S_4$ are opened, the pointer of the measuring instrument remains stationary at the measured value in each case until the condensers $C_1$ and $C_2$ are discharged by closing of the switches $S_5$ and $S_6$, through the resistances $R_1$ and $R_2$, as shown in FIG. 2.

The measuring arrangement works in the following manner, after an article to be measured has been placed under the feeler 2.

According to FIG. 2, an anode current flows through the twin triode 27 both through the relay coil 25 and through the relay coil 26. Thus the switches or relay contacts $S_1$, $S_2$ and $S_5$, $S_6$ are closed, while the switches or contacts $S_3$ and $S_4$ working oppositely to the contacts $S_1$ and $S_2$ are opened. The current flowing in the control lead by way of the contact $S_2$ and the magnet coil 28 arranged in the length-measuring feeler 20 has first lifted the feeler 2 away from the article 1 to be measured. The feeler 2 then descends on to the article to be measured, when the control switch 29, which carries the contacts $A_1$ to $A_5$, is moved to the right, whereby the contact $A_5$ is opened (FIG. 3).

In this tipping movement, the contacts $A_3$ and $A_4$ (as shown in FIG. 3) have discharged the condensers $C_3$, $C_4$ and $C_5$, $C_6$. Therefore the relays 25 and 26 drop out, and the switch position shown in FIG. 1 occurs, as soon as the control switch 29 has returned into its initial position. Thus the condensers $C_1$ and $C_2$ are charged up to the voltage corresponding to the measured value, and the deflection of the tube voltmeter indicates the dimension of the measured article.

As soon as the control switch 29 has returned, after moving, into its initial position, the short-circuit of the condensers $C_3$, $C_4$ and $C_5$, $C_6$ as shown in FIG. 3 is removed, and the condensers $C_3$ and $C_4$ now charge up again slowly through the variable resistance $P_1$, this charging time being set as short or long as desired. When the condensers $C_3$ and $C_4$ have become charged up so far that the voltage applied to the left-hand grid of the tube 27 corresponds approximately to the cathode voltage applied to the stabiliser tube 28', current flows through the left-hand system of the tube 27, and the relay 25 pulls up again. Now the contacts $S_3$ and $S_4$ leading to the measuring instrument are opened, and thus the measured value condensers $C_1$ and $C_2$ are separated from the measured value circuit 21. However the condensers $C_1$ and $C_2$ do not discharge, or they vary their momentary state only after very long periods of time, because the condensers with the leads and switches possess a very high insulation value. Thus the next measurement on the following article to be measured can be carried out in the meantime, without the indication on the instrument 24 changing. Only when no fresh measurement is carried out for several minutes does the relay 26 also pull up, because the condenser $C_5$ charges up more slowly through the resistance $R_6$ in its circuit, which is greater than $P_1$. When the relay 26 pulls up, the contacts $S_5$ and $S_6$ close, thus discharging the condensers $C_1$ and $C_2$ and cancelling the indication on the instrument 24. The time until cancellation can be set for example at 1 to 5 minutes, by means of the variable resistance $R_6$. In every case the greater resistance $R_6$ charges up the condensers $C_5$ and $C_6$ of the right-hand system of the tube 27 more slowly than the condensers $C_3$ and $C_4$ are charged up through the resistance $P_1$, so that the relay 26 responds later than does the relay 25 connected with the left-hand system of the tube 27.

This relay 25 has pulled up in the meantime, as already mentioned, and as shown in FIG. 7, and thereby closed the contact $S_2$ lying in the control lead. Since the contact $A_5$ of the control switch 29 is also closed, the magnet coil 28 is energized, and lifts the feeler 2 away from the article to be measured. Due to the discharge of the condenser $C_7$, the lifting movement takes place sharply, while after the discharge of $C_7$ the holding of the feeler takes place with only a weak current. Now a fresh article 1 to be measured can be placed beneath the feeler 2. On renewed tipping of the control switch 29 to the right a new measured value is now taken from the feeler 2 and fed to the measured value circuit 21, which forms a new output voltage. This voltage is fed, since the relay 25 has dropped off, to the measurement value condensers $C_1$ and $C_2$, which are still charged. According to whether this voltage is higher or lower, the condensers $C_1$ and $C_2$, which are preferably of a value between 0.01 and 1 $\mu f.$, now assume a higher or a lower voltage, and thus the pointer of the instrument 24 moves directly to the greater or smaller deflections proportional to the new measured value. Thus an inspector sees without any possibility of error how the measured value of the last article is related to that of the preceding article or articles.

Figure 6:
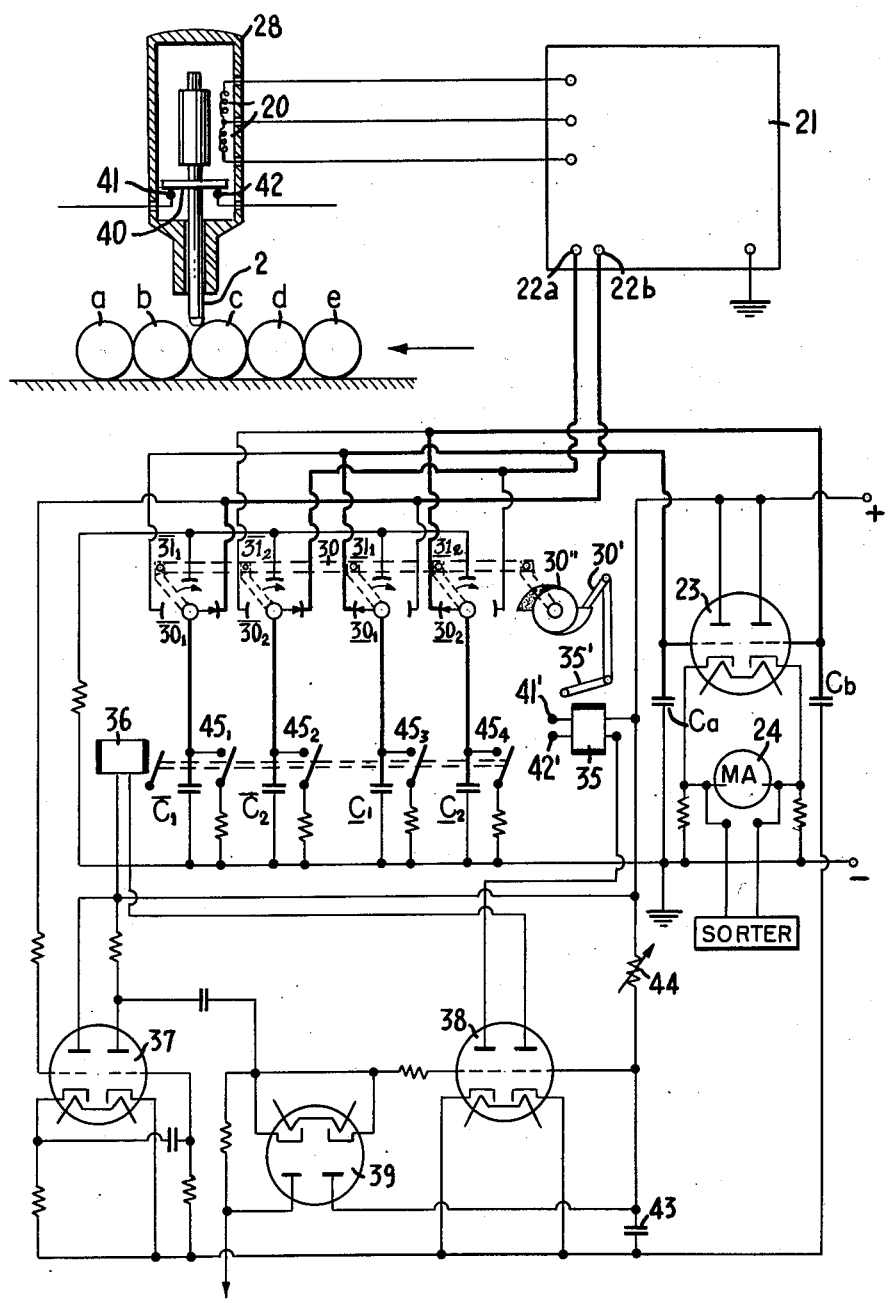
FIG. 6 is a schematic illustrating the same apparatus as FIG. 5, but at the moment when the switch-over from one storage set to the other is effected by the movement of the feeler when it is placed on a fresh article to be measured.

A sorting arrangement, for example, as described in United States Patent, No. 2,592,157 can be connected to the output terminals 19, parallel to the instrument 24 as shown diagrammatically in FIG. 6.

The arrangement as described works quite normally without fixing of the measured value, if the control switch 29 is held fast in the left-hand position and at the same time the contacts $A_1$ and $A_2$ are closed.

The circuit represents only an example of embodiment, since electronic switches with tubes or transistors can be used in place of the electro-mechanical relays. In place of the tube-voltmeter circuit 23 and 24, it is also possible to use other embodiments of tube-voltmeters or indicator instruments of electrical type, with mechanical locking, for example an electrical indicator instrument, the pointer 10 of which is controlled by the voltages produced on the output terminals 22a and 22b of the amplifier 21. The connections leading from the magnet coil of said indicator instrument to the output terminals 22a and 22b are not shown. The pointer 10 is provided with a mechanical pointer lock or brake 10'', pressed against the pointer 10 by the action of a spring 11. Upon the energization of an electromagnet 12, the armature 10' is attracted and the lock or brake 10'' is lifted away from the pointer 10.

The push-pull tube-voltmeter circuit 23/24 is specially favorable because all reaction of the tube 23 upon the measured value condensers $C_1$ and $C_2$ takes place in the same magnitude on both, so that the potentials on the cathode resistances of the tube 23 also vary in the same sense, and not contrarily like the measured value voltages. The instrument 24 however does not indicate the variations in the same sense, so that the circuit is particularly stable in indication, even over relatively long periods.

The lifting of the feeler 2 away from the article 1 to be measured, as here described, by means of the magnet coil 28, represents only an example of embodiment of the apparatus, for the apparatus can in fact also be used without this lifting movement. According to FIGS. 1 to 3, the article to be measured lies in a prism or V-block under the feeler 2. In place of the V-block, a flat table top can be provided, if it is desired simply to roll the article to be measured through beneath the feeler 2. The feeler will then climb over the top of the cylindrical article to be measured, and the pointer will then show the maximum diameter. Such a measurement can be carried out very much more rapidly than according to the previous methods, wherein the article to be measured had to be rolled back and forth a number of times in order to find the highest point. Preferably the variable resistance $R_6$ will be so dimensioned that zeoroizing times of 0.5 to 30 seconds can be set. The articles to be measured can then be rolled through beneath the feeler so fast one after the other that cancellation and fresh indication follow one another without major deviations of the pointer towards zero or to the end values of the scale.

Figure 5:
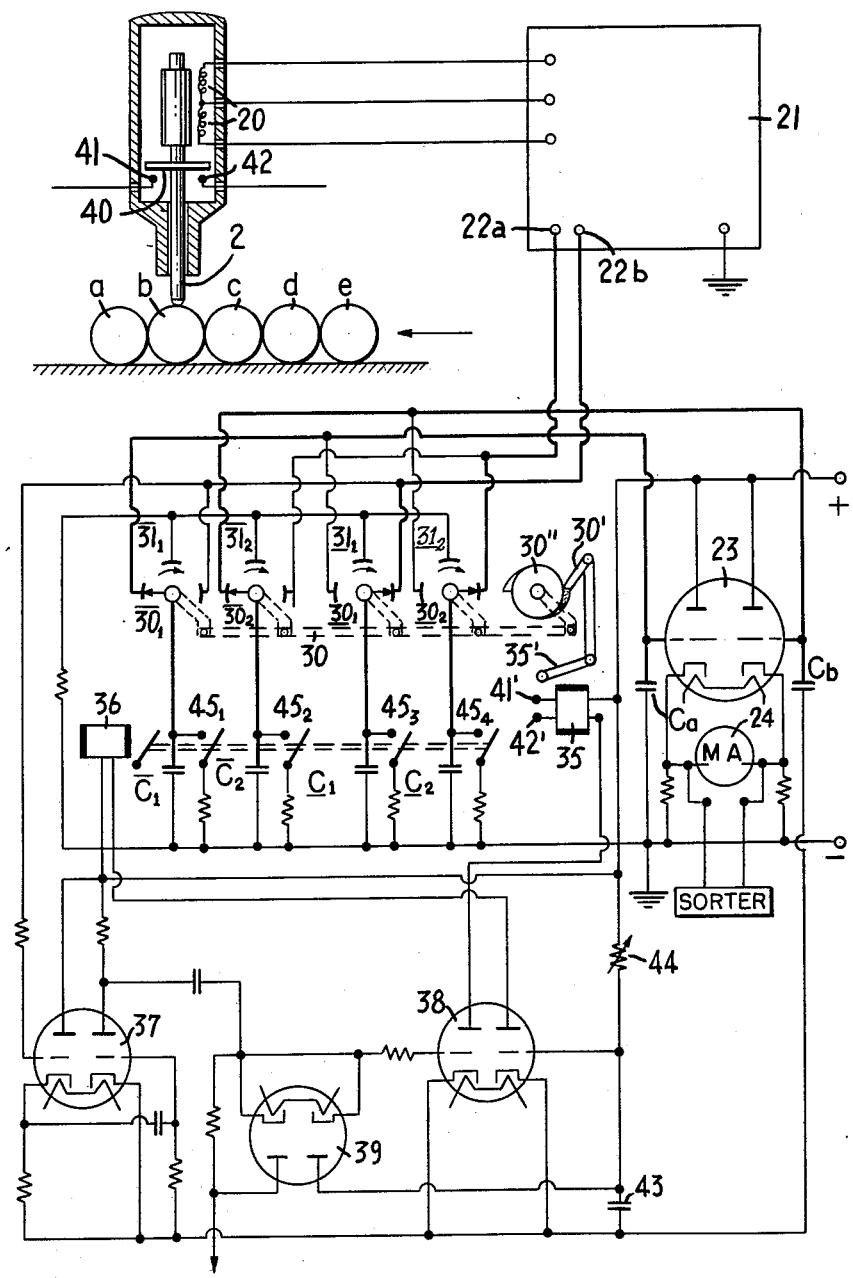
FIG. 5 is a schematic which illustrates a further development of the apparatus according to FIG. 1. Here there are provided two storage sets, capable of being switched over, for holding fast the pointer and for the control of the switch-over by the upward and downward movement of the feeler in the change of the articles to be measured.

FIGS. 5 and 6 illustrate an arrangement for the series testing of articles to be measured. This arrangement works fundamentally just like the arrangement as shown in FIGS. 1 to 3; it differs in as much as the article to be measured controls the upward and downward movements of the feeler 2, the coupling and locking operation and the storage and cancellation of the indication voltage.

The measuring feeler 2 touches the articles to be measured, which are pushed in a series $a$, $b$, $c$, $d$, etc. through beneath the feeler. The voltage corresponding to the article to be measured is produced in known manner at the terminals 22$a$, 22$b$ by means of an inductively operated length-measuring sensor 20 and a measured value circuit 21, and fed alternately to the measured value condensers $C_1$, $C_2$ or $\overline{C}_1$, $\overline{C}_2$ arranged in two groups, through a step-switch mechanism 30. The step-switch mechanism 30. The step-switch mechanism switches the groups $C_1$, $C_2$ and $\overline{C}_1$, $\overline{C}_2$ alternately to the respective grids of a twin triode 23, to which the tube-voltmeter instrument 24 is connected for indicating the size of the measured articles.

The step-switch mechanism 30, 30′, 30″ is actuated by the electromagnet 35, 35′, which is arranged in the anode circuit of a twin triode 38. If a pulse is fed to the electromagnet 35, 35′, it pulls up the armature 35′, which is connected with the pawl 30′. The pawl 30′ shifts a ratchet wheel 30″, which is connected with the switches $\overline{30}_1$, $\overline{30}_2$, $30_1$ and $30_2$. Every time the magnet 35 pulls up, the contact fingers of these four switches are rotated through 180°. The representation of this step-switch mechanism in FIG. 5 is diagrammatic, in order to illustrate the principle of the alternate connection of the measured value condensers $\overline{C}_1$ and $\overline{C}_2$ on the one hand and $C_1$, $C_2$ on the other hand to the tube 23. In place of the magnet 35, which pulls up the armature 35′, it is also possible to use a rotary magnet, which rotates an armature through 180°, or a motor. It is also possible to provide a plurality of contact sets and to connect them together so that the four contact fingers are advanced for example only through 30° at every pulse. Similarly, in place of the stated step-switch mechanism it is possible to connect a plurality of relays together to form a chain, which will switch over the switching circuits at every pulse in the same direction as the step-switch mechanism. In place of such relay chains, contactless switch chains can be built up with the aid of crystal diodes and transistors or with electronic tubes.

As shown further by FIGS. 5 and 6, the contact fingers of the step-switch mechanism pass the intermediate contacts $\overline{31}_1$, $\overline{31}_2$, $31_1$, $31_2$ at every switch-over operation, and in doing so discharge the measured value condensers before these are charged up again by the measured value circuit 21.

FIG. 5 shows how the feeler 2 slides away just over the top of the article $b$ to be measured, when the articles are pushed through beneath the feeler. The output terminals 22$a$ and 22$b$ of the measured value circuit 21 are connected with the condensers $C_1$ and $C_2$, and they are therefore charged up to the voltage level corresponding to the measured value. At the same time the other two measured value condensers $\overline{C}_1$ and $\overline{C}_2$ are connected to the grids of the tube 23; their state of charge, which corresponds to the thickness of the preceding article $a$, is indicated on the instrument 24.

If the measured articles are pushed further, the feeler 2 slides down from the apex of the article $b$ and rises again on the next measured article $c$ up to the top thereof, as shown in FIG. 6. Such movement of the feeler 2 delivers the pulse for the actuation of the step-switch mechanism, while in fact the feeler slides down from the measured article $b$ and slides up again on the next article $c$, so that it travels a very long distance in relation to the differences of thickness to be tested of the articles for measurement; these movements produce very great voltage differences in the measured value circuit 21 on the output terminals 22$a$ and 22$b$. The polarity of the voltage pulse in the sliding down from one article $b$ is opposite to the polarity of the voltage pulse in the sliding up on to the next article $c$. One of these pulses can be used for shifting the step-switch mechanism 30, through the magnet coil 35 by means of the armature 35′. According to FIG. 6, the pulse occurring in the sliding up on to the article $c$ is used for the control of the step-switch mechanism 30. For this purpose, the output terminal 22$b$ of the measured value circuit 21 is connected with a grid of a tube 37; the two amplifier systems of the tube 37 and the left-hand system of the tube 38 form a pulse amplifier for this purpose. The point in fact is that a strong voltage pulse lasting for a definite time is formed immediately, after the direction of movement of the feeler 2 reverses, when the feeler, after sliding down from the article $b$ slides up on to the article $c$. This voltage pulse effects, in the anode circuit of the left-hand system of the tube 38, such a current flux that the winding 35 pulls up the armature 35′; thus the step-switch mechanism 30, 30′, 30″ is shifted. In the circuit of this pulse amplifier there is arranged a double diode 39, one system of this double diode 39 serving to limit or clip off the pulse apex, whereby the pulse is widened in the anode circuit of the tube 38.

As shown in FIG. 6, when the feeler 2 slides up on to the article $c$, the step-switch mechanism is shifted through 180°, the condensers $C_1$ and $C_2$ being thus connected to the grids of the tube 23. Consequently now the thickness of the article $b$ is indicated on the instrument 24. On the switching over of the step-switch mechanism, the condensers $\overline{C}_1$ and $\overline{C}_2$ were discharged; they are now connected to the output terminals 22$a$ and 22$b$ of the measured value circuit 21 and are charged up to the maximum voltage, which occurs due to the fact that the feeler 2 slides away over the top of the article $c$.

The pulse for the magnet 35, 35′ of the step-switch mechanism 30 can also be produced by an electric contact control. Thus for example the articles $a$ to $e$ or their feed arrangements can actuate electrical contacts, or the measuring feeler 2 could be connected with a contact bar 40 which connects the contacts 41 and 42 when the feeler drops off. These contacts 41 and 42, or the contacts actuated by the article or by the feed arrangement are then connected, for example with interposition of a suitable source of current, with the terminal 41′ and 42′ of the magnet winding 35. This current circuit is not represented in the drawings in order not to decrease their clarity.

The condensers $C_a$ and $C_b$ arranged behind the switches of the step-switch mechanism, in the grid circuit of the tube 23, are about 1/100 as great as the measured value condensers $C_1$, $C_2$ or $\overline{C}_1$, $\overline{C}_2$. They ensure that in the switching over of these two groups of measured value condensers, the grids of the tube 23 remain electrically closed. The condenser 43 connected in series with the resistance 44 is slowly charged up. At a specific state of charge, which is adjustable through the resistance 44, the right-hand system of the tube 38, which is otherwise blocked, becomes conductive. Thus the relay 36 receives current and closes the switches $45_1$ to $45_4$ connected therewith, the measured value condensers being then discharged. In this manner the object is achieved that the indication on the instrument 24 is zeroized if no fresh measurement takes place within a period 1 to 5 minutes.

The circuit represented in FIGS. 5 and 6, which connects two groups of measured value condensers by means of a switch mechanism alternately to the grids of the tube 23, can be extended to as many groups of measured value condensers as may be desired.

A plurality of groups of such measured value condensers can be useful in sorting apparatus, wherein it may happen that the articles to be measured are brought from a conveying device, for example a shifting plate, beneath the feeler 2, and must be transported according to the result of the measurement into a distributing arrangement situated near to or remote from the measuring position. The measured value must in this case be stored until the measured article reaches the compartment allocated to it. In such cases, for example, as many sets of measured value condensers may be connected with the conveyor or shifting plate as the latter can receive and transport articles to be measured. Each compartment is connected with a normally blocked tube voltmeter, which only responds at a specific charge voltage of the measured value condensers. The output power of the tube voltmeter is so dimensioned that it is sufficient to convey the measured article, on response, from the shifting plate into the compartment of the distributing arrangement corresponding to the length or thickness of the measured article. In the measuring position, the measured value condensers are first charged up to the measured value, and then successively explored by the tube voltmeters of the distribution boxes. As soon as the charge voltage of the measured value condensers corresponds to the response voltage of a tube voltmeter connected with the distribution boxes, this voltmeter switches and conveys the measured article into the appropriate distribution box. Before the measured value condensers are connected again with the measuring position, they are discharged.

The switch-over between two measured value storage groups, as represented in FIGS. 5 and 6, can also be modified by the arrangement of only a single condenser group before the tube 23, as shown similarly by FIGS. 1 to 3. To the output terminals 19 of the tube voltmeter (FIGS. 1 to 3) there are then connected as many relays as there are sorting channels, each of which relays pulls up on the occurrence of a specific output voltage level corresponding to a specific charging up of the measured value condenser, but only drops off due to a special zeroizing pulse. Said pulled-up relay thus has the effect that the measured article drops into the box corresponding to its thickness or length, while the next article is measured and the measured value condensers are charged up with this new measured value. The changeover between this measuring operation and distribution operation takes place through a contact control of the feeler, article or conveyor, as described with reference to FIGS. 5 and 6, or without contacts due to the movement of the feeler 2 over the articles to be measured.

The circuits shown in FIGS. 1 to 6 comprise as example of embodiment electronic tubes and electromechanical relays. The circuits can equally be built up with transistors and diodes, with which, as is known, contactless switching operations can be effected.

The measured value condensers $C_1$ and $C_2$ must not discharge abnormally. If the switches $S_3$ and $S_4$ or $\overline{30}_1$, $\overline{30}_2$, $\underline{30}_1$, $\underline{30}_2$ do not prevent this, diodes are so installed in the feed conduits to the measured value condensers that they possess a very low forward resistance in the charging direction, but an extremely high blocking resistance in the direction of discharge.

FIGS. 1 to 6 show measured value condensers $C_1$, $C_2$, and $\underline{C}_1$, $\underline{C}_2$, $\overline{C}_1$ $\overline{C}_2$ arranged symmetrically in the circuit. They are connected symmetrically to the output terminals 22a and 22b of the measured value circuit 21 and are connected with the grids of the tube 23. As will be understood, it is also possible to work asymmetrically, and in so doing to connect one terminal, for example 22b, to ground, but only to charge up one condenser $C_1$ from the terminal 22a. However, for reasons of greater constancy of the indication, it is advisable to use the push-pull tube-voltmeter 23/24 in the stated circuit. The condenser $C_2$ or $\overline{C}_2$, $\underline{C}_2$ will then be connected with the switch $S_6$ or $\overline{30}_2$, $\underline{30}_2$ and no longer with 22b; thus, although it is no longer used for the storage of the measured value, the condenser nevertheless retains its compensating effect against the internal disturbances of the tube 23. This second condenser is discharged to zero potential before the start of the measurement. On the other hand, the possibility also exists of charging it up to a specific, fixed, positive or negative, reference potential.

What we claim is:

1. A linear dimension gauge apparatus comprising, an electrical gauge head having a reciprocable feeler for sensing individual articles of subject matter to be gauged and means for converting the feeler movements into electrical output signals representative of the value of the measured dimension, an electrical measuring mechanism connected to said head and having a pointer for indicating the measured values, automatic coupling means operably coupling the measuring mechanism and the gauge head feeler, a locking device for releasably holding the pointer at indicating positions corresponding to the last successive indication representative of a gauge dimension reading taken on the subject matter comprising an electronic circuit having capacitors chargeable to a capacitance value representative of the measured value between successive gauge readings, means connected to respond to the capacitance value to maintain the pointer at indicating position as long as the capacitors are in a charged condition, and means to discharge at least some of the capacitors between successive gauge readings.

2. A linear dimension gauge apparatus according to claim 1, in which the automatic clutch means comprises, an electrical circuit having circuit switches responsive to the gauge head output signals for connecting said measuring device with the gauge head.

3. A linear dimension gauge apparatus according to claim 1, including sorting means responsive to the capacitors for distributing the articles to separate positions representative of the measured value stored in said capacitors.

4. A linear dimension gauge apparatus comprising, an electrical gauge head having a reciprocable feeler for sensing subject matter to be gauged and means for converting the feeler movements into electrical output signals representative of the value of the measured dimension, an electrical measuring mechanism connected to said head and having a pointer for indicating the measured values, automatic coupling means operably coupling the measuring mechanism and the gauge head feeler, a locking device for releasably holding the pointer at indicating positions corresponding to the last successive indication representative of a gauge dimension reading taken on the subject matter comprising an electronic circuit having a memory comprising storage means chargeable to a capacitance value representative of the measured values between successive gauge readings, means connected to respond to the capacitance value storage to maintain the pointer at indicating position as long as the storage means are in a charged condition, and means to discharge at least some of the storage means between successive gauge readings.

References Cited in the file of this patent

UNITED STATES PATENTS

| | | |
|---|---|---|
| 1,341,463 | Hazard | May 25, 1920 |
| 1,645,118 | Seabright | Oct. 11, 1927 |
| 2,433,585 | Warner | Dec. 30, 1947 |
| 2,499,665 | Mestas | Mar. 7, 1950 |
| 2,592,157 | Kendall | Apr. 8, 1952 |